May 5, 1964   F. SCHWEIKHARDT ETAL   3,131,620
DIAPHRAGM BLOCKING STRUCTURE FOR AUTOMATIC CAMERAS
Filed Oct. 22, 1959
FIG. 1
FIG. 3
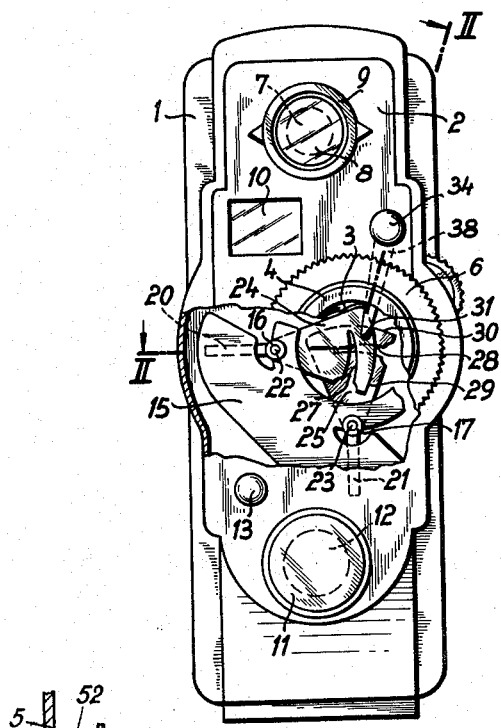
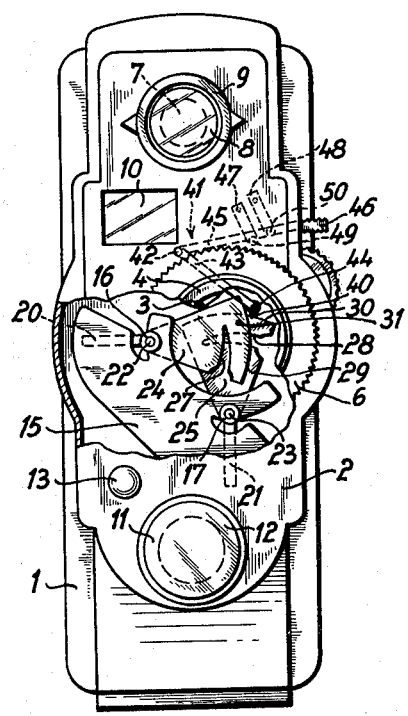
FIG. 4
FIG. 2
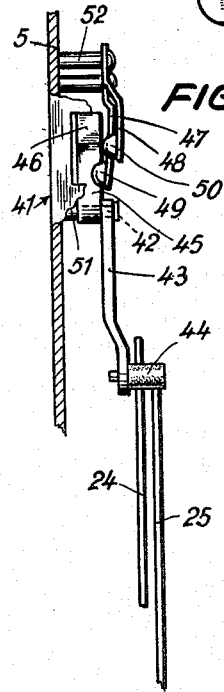
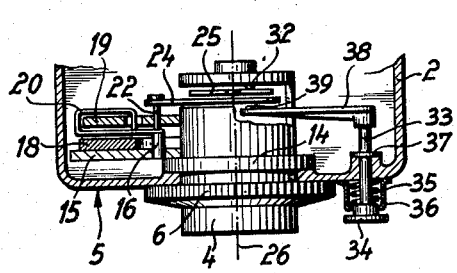
FIG. 5
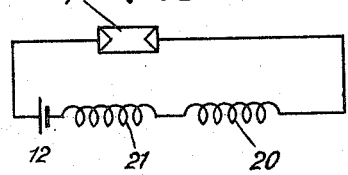
INVENTORS
Friedrich Schweikhardt
Herbert Reinsch
Ernst Lieser
BY Michael S. Striker
attorney

United States Patent Office 3,131,620
Patented May 5, 1964

3,131,620
DIAPHRAGM BLOCKING STRUCTURE FOR AUTOMATIC CAMERAS
Friedrich Schweikhardt and Herbert Reinsch, Stuttgart, and Ernst Lieser, Stuttgart-Vaihingen, Germany, assignors to Eugen Bauer G.m.b.H., Stuttgart-Unterturkheim, Germany
Filed Oct. 22, 1959, Ser. No. 848,065
Claims priority, application Germany Nov. 6, 1958
10 Claims. (Cl. 95—64)

The present invention relates to cameras.

More particularly, the present invention relates to cameras which have automatic exposure control devices such as an automatically operable diaphragm means which operates automatically in response to the amount of light received by a light-sensitive element of the diaphragm means for automatically setting the aperture of the camera.

Cameras of this latter type are of particular value since they relieve the operator of the necessity of setting the exposure control structure of the camera such as the diaphragm thereof. This is true particularly in the case of motion picture cameras where scenes may change and lighting conditions change from scene to scene. However, there is a disadvantage in cameras of this type, in that under certain circumstances it is not desired to change the setting of the aperture of the camera, and the automatic structure of the camera will change the diaphragm setting and provide an improper exposure due to the automatic operation of the camera.

For example, when photographing a relatively high object such as a tower or even a tree by slowly turning a motion picture camera, for example, from the bottom toward the top of such a relatively tall object, it is apparent that during the upward turning of the camera a greater amount of light will reach the light-sensitive element of the automatic control structure and as a result the aperture will automatically become smaller and smaller, whereas in order to provide a proper exposure under such circumstances the diaphragm should be maintained at a constant setting so that an accurate photograph of the increasing light which reaches the tall object from the bottom to the top thereof will be obtained. Under these circumstances, the automatic structure prevents proper exposures from being made.

The same is true, for example, when operating a camera while travelling through a tunnel. Suppose, for example, that the camera is focused through a tunnel on an object located on the opposite side of a tunnel while the photographer who carries the camera approaches the tunnel to move through the latter toward the object which is being photographed. Under these circumstances the aperture should of course be set according to the lighting conditions which are outside of the tunnel, but upon entering into the tunnel the amount of light reaching the automatic structure will suddenly diminish sharply and the aperture will be widened considerably whereas it should of course be maintained at a constant preset value according to the lighting conditions outside of the tunnel, and here again the automatic structure prevents a proper exposure from being made.

The present invention has for its primary object the provision of a camera which will enable the operator to make proper exposures under conditions such as those described above.

A further object of the present invention is to provide a camera with a manually operable means capable of being actuated at the will of the operator to prevent automatic actuation of a diaphragm of the camera.

A further object of the present invention is to provide a relatively simple manually operable structure which will reliably operate to maintain the diaphragm of a camera at the setting at which it happens to be at a given moment for as long a time as desired by the operator before again releasing the diaphragm, at the will of the operator, to the structure which automatically controls the diaphragm.

With the above objects in view the present invention includes in a camera an automatic diaphragm means which operates automatically to set the aperture of the camera according to the amount of light which reaches a light-sensitive element of the automatic diaphragm means. In accordance with the invention the camera includes a manually operable blocking means which cooperates with the diaphragm means to block the operation thereof and thus maintain the diaphragm means at a given setting irrespective of the structure which operates automatically to set the diaphragm means, and thus it is possible with the structure of the invention to maintain a given diaphragm setting although when desired the camera is released for automatic operation.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a partly broken away elevation of a camera which includes the structure of the invention;

FIG. 2 is a sectional plan view taken along lines II—II of FIG. 1 in the direction of the arrows;

FIG. 3 is a front elevation partly broken away of another embodiment of a camera including a structure according to the present invention;

FIG. 4 is a side view of part of the structure of FIG. 3 on an enlarged scale as compared to FIG. 3; and FIG. 5 is a schematic wiring diagram of the electrical structure.

The drawings illustrate the invention as applied to a motion picture camera since the structure of the invention is of the greatest significance and of the most importance in a motion picture camera, although, of course, it is to be understood that the structure of the invention is equally applicable to still cameras.

Thus, referring to FIG. 1, it will be seen that the motion picture camera illustrated therein includes a main housing 1 and a front assembly 2 fixed to the front end of the main housing 1. This front assembly 2 carries the objective 3 which includes a lens tube 4. The front wall of the front assembly 2 forms the front end 5 of the camera. The lens tube 4 carries forwardly of the front wall 5 an annular adjusting ring 6 accessible to the operator for adjusting the objective, as is particularly apparent from FIG. 2.

The front assembly 2 carries a photoelectric light-sensitive element 7 behind the window 8, this element 7 being made, for example, of selenium so as to generate more or less current depending upon the amount of light which reaches the element 7 through the window 8, and the window 8 is surrounded by an adjusting ring 9 which operates a diaphragm which cooperates with the window 8 so as to open or close the latter to a greater or less degree depending upon, for example, the film speed, the ring 9 being set at an angular position according to a particular speed of the film used in the camera, and for this purpose the ring 9 carries one or more indices cooperating with one or more unillustrated scales, respectively, carried by the front face of the forward unit 2.

The front unit 2 of the camera also includes a window 10 of a viewfinder assembly and in addition the front unit carries a battery 12 located in a recess which is covered by a removable plug 11. Furthermore, a release plunger 13 extends through the front assembly 2 so as to be accessible to the operator to be actuated for starting and stopping the operation of the camera in a well known manner.

The objective lens tube 4 is fixed to the unit 2 through the medium of a flange 14 which engages the rear surface of the wall 5 in the manner shown in FIG. 2. The base plate 15 of a measuring instrument is screwed onto the flange 14 so as to be carried thereby, and this instrument includes a pair of bearings 16 and 17 as well as a permanent magnet 18 and an auxiliary plate 19 spaced from the magnet 18. The free ends of the auxiliary plate are respectively surrounded by a pair of coils 20 and 21 which extend with clearance around the elongated free end portions of the auxiliary plate 19, and the loop-shaped coils 20 and 21 are respectively connected with the shafts 22 and 23 which are respectively supported for rotation about their axes by the bearings 16 and 17. The shaft 22 fixedly carries a diaphragm blade 24 while the shaft 23 fixedly carries a diaphragm blade 25, and thus the blades 24 and 25 are turnable together with the shafts 22 and 23, respectively, these shafts turning with the coils 20 and 21, respectively. The axis of shaft 22 is located with the optical axis 26 in a first plane which is perpendicular to a second plane in which the axis of the shaft 23 and the optical axis are located. Also, as is particularly apparent from FIG. 2, the diaphragm blades 24 and 25 are located very close to each other and are parallel to each other.

The diaphragm blade 24 is formed with an arcuate slot 27 of substantially wedge-shaped configuration extending upwardly from the lower edge of the blade 24, as viewed in FIG. 3, and toward the upper edge of the blade 24 but terminating short of this upper edge, and in the same way the diaphragm blade 25 is formed with an arcuate slot 28 of substantially wedge-shaped configuration extending from the right edge of the blade 25, as viewed in FIG. 3, toward the left edge thereof but terminating short of this left edge. As is apparent from FIG. 3, the pair of arcuate wedge-shaped slots 27 and 28, whose centers are respectively located in the axes of the shafts 22 and 23, intersect each other so as to provide an aperture of a predetermined cross sectional area, and as is particularly apparent from FIG. 3, as the diaphragm blades turn the wedge-shaped slots 27 and 28 will overlap each other to increasing or decreasing extents so as to increase or decrease the size of the exposure aperture of the camera.

The blades 24 and 25 turn with respect to each other through predetermined angles and they are made of such a size with respect to the maximum angles through which they turn that at all times portions of the blades 24 and 25 overlap each other, and at the location 31 there are portions of blades 24 and 25 overlapping each other at all positions of the blades. The lens-carrying tube 4 of the objective is provided with a stationary stop 32 aligned with the location 31 where the blades always overlap each other and located to the rear of the blades, as is apparent from FIG. 2.

As is apparent from the above description the structure of the camera includes an automatic diaphragm means made up of the blades 24 and 25 which are automatically operated by the automatic control means which includes the above-described coils, magnet, battery, and light-sensitive element 7, so that in accordance with the amount of light received by the light-sensitive element 7 the coils 20 and 21 will turn so as to place the diaphragm blades automatically in angular positions with respect to each other which will provide a proper aperture for a proper exposure. In accordance with the present invention a manually operable blocking means is provided for blocking the operation of the diaphragm by the automatic control means so as to prevent operation of the automatic diaphragm means of the invention and thus maintain the aperture which is set into the camera at any time at the option of the operator irrespective of the automatic control structure. This manually operable blocking means includes in the embodiment of FIG. 2 an elongated shaft 33 which extends parallel to the optical axis and which is supported for axial movement by a suitable sleeve which forms part of the front wall 5 of the unit 2, as is apparent from FIG. 2. This shaft 33 is provided at the exterior of the camera with an actuating knob 34, and between the knob 34 and the front surface of the camera is located a spring 35 which forms a spring means urging the manually operable blocking means to the rest position thereof which is illustrated in FIG. 2, the spring 35 engaging the knob 34 in the front surface of the camera so as to place a collar 37 which is fixed to the shaft 33 against the rear surface of the sleeve which slidably supports the shaft 33 for axially shifting movement. A flexible envelope 36 of rubber or fabric surrounds the spring 35 and is fixed to the knob 34 as well as to the front face of the camera so that the spring 35 is not exposed.

The manually operable blocking means includes in the interior of the unit 2 a substantially rigid extension 38 fixed to the shaft 33 and extending radially therefrom and terminating at its end distant from the shaft 33 in a projection 39 which is aligned with the stop 32 but located on the side of the blades opposite from the stop 32, this projection 39 forming a pressing means capable of pressing against the diaphragm blades at the location 31 where they always overlap so as to press the pair of diaphragm blades between the stationary stop 32 and the pressing means 39 and thus maintain the diaphragm stationary irrespective of the changes in the amount of light which reach the light-sensitive element 7. The elongated member 38 extends through an axial slot of the tubular lens carrier 4 in such a way that this slot prevents angular turning of the member 38 and thus maintains the projection 39 aligned with the projection 32. The spring 35 maintains the blocking means in the rest position thereof illustrated in FIG. 2 where the diaphragm blades are free to turn in response to the influence of the automatic control means. However, when the operator presses the knob 34 toward the rear of the camera in opposition to the spring 35, the diaphragm blades will be pressed between the projection 32 and the projection 39 so as to remain stationary as long as the operator presses on the knob 34. Upon release of the knob 34, the spring 35 automatically returns the parts to the position shown in FIG. 2 so that the blades are again free to turn in response to the actuations derived from the automatic control means.

During operation of the camera current flows from the battery 12 through the coils 20 and 21, and the strength of the current is dependent upon the amount of light which reaches the light-sensitive element 7 which is electrically connected with the coils 20 and 21. According to the strength of the current flowing through these coils, the latter turn in opposition to the forces of a pair of unillustrated return springs around the axes of the shafts 22 and 23 and thus the blades 24 and 25 are turned to angular positions which will provide the proper aperture. When relatively large currents are provided the amount of light reaching the light-sensitive element is quite large and at such time the blades are automatically placed in a position such as that illustrated in the drawing where the aperture is relatively small. On the other hand, where a relatively weak current flows through the coils 20 and 21 the amount of light reaching the element 7 is necessarily small and under these conditions the coils place the blades in angular positions which will provide a relatively large exposure aperture.

If it is assumed that a photograph is being made of a tower or a tree and the camera is being turned from the bottom toward the top of such a subject, then the upward turning of the camera will sharply increase the intensity of the light which reaches the light-sensitive element 7. Thus, the exposure which is made of an object such as a tower or a tree under these circumstances will be provided with a continually diminishing aperture because as the camera is turned up the amount of light reaching the element 7 increases in intensity and thus the diaphragm blades automatically turn to positions which provide continuously smaller exposure apertures, and under these circumstances an improper exposure of such a tower or tree will be made, and this is particularly true when making color photographs.

Thus, under such circumstances the operator will at the beginning of the photographing of such an object press the button 34 toward the rear of the camera and thus block the operation of the diaphragm in the above-described manner. Thus, during the upward turning of the camera from the bottom toward the top of a tower or a tree the exposure aperture will remain unchanged and a proper exposure will be made.

If, for example, a photograph is to be made while moving through a tunnel, then the automatic control structure would automatically increase the size of the aperture sharply when the camera is within the tunnel itself, and thus an overexposure would be made if photographing an object while moving through a tunnel under these circumstances. Therefore, before entering into the tunnel the operator will press the knob 34 so as to block the operation of the diaphragm and make the proper exposure aperture.

According to the embodiment of the invention which is illustrated in FIG. 3 the structure is identical with that of FIGS. 1 and 2 except for the manually operable blocking means used to maintain the diaphragm blades in their angular position at the will of the operator.

As is apparent from FIG. 3, the diaphragm blades are provided distant from their turning axes, respectively, with a pair of arcuate free edges 29 and 30 which extend respectively along circles whose centers are respectively in the turning axes of the blades. These arcuate free edges 29 and 30 intersect at 40. It will be noted that this intersecting point 40 of the free edges of the blades is located adjacent to the point 31 where the blades always have overlapping portions. A friction element 44 is provided to engage the blades at the will of the operator close to the intersection 40 of the free edges of the blades, and this friction element 44 is carried by a manually operable means which in the illustrated example is in the form of a bell crank 41 turnable on a pivot pin 42, as is diagrammatically illustrated in FIG. 3. Thus, the lever 41 is turnable about an axis parallel to the optical axis. In accordance with the invention the structure is such that a plane in which the axis of the pivot pin 42 and the point 40 are located is parallel to a second plane in which the axes of the shafts 22 and 23 are located. The friction element 44 which is made of a resilient elastic relatively soft material such as soft rubber is carried by the lower arm 43 of the bell crank 41. In the rest position of the blocking means of FIG. 3 the friction element 44 thereof is adjacent but spaced from the free edges of the blades adjacent to the intersecting point 40 thereof, and the blades can turn freely without any interference from the friction element 44 in the rest position of the blocking means which is shown in FIG. 3. The lever 41 includes a second arm 45 which extends through a slot in the side wall of the camera and is therefore accessible at its free end portion 46 to the operator who can turn the lever 41 so as to actuate the manually operable blocking means of the embodiment of FIG. 3. Thus, by engaging the free end portion 46 of the arm 45 of the lever 41 the operator can move the element 44 from the illustrated rest position thereof to an operating position where the element 44 presses against the edges 29 and 30 of the blades of the diaphragm to prevent turning of these blades by the automatic control means.

The embodiment of FIG. 3 includes a detent means which cooperates with the lever 41 to releasably maintain the latter either in the rest position of the blocking means which is shown in FIG. 3 or in the operating position of the blocking means where the friction element 44 presses against the edges of the blades. This detent means includes a pair of leaf springs 47 and 48 which are fixed to the inner, rear surface of the front wall 5 of the unit 2. Each of the leaf springs 47 and 48 carries at its lower free end a substantially hemispherical projection, and thus FIG. 3 shows the leaf springs 47 and 48 respectively carrying the hemispherical projections 49 and 50. As is apparent from FIG. 3 the hemispherical projections 49 and 50 are offset with respect to each other transversely of the arm 45. Their location is such that in the illustrated rest position of the manually operable blocking means the projection 50 is pressed by the spring 48 against a side face of the lever arm 45 while the projection 49 extends across the lower edge of the arm 45 with the spring 47 bearing against a side surface of the arm 45 and thus the parts serve to releasably maintain the manually operable means in the illustrated rest position thereof. When the operator engages portion 46 of arm 45 and turns this portion 46 downwardly, the friction element 44 will engage the edges 29 and 30 to block the operation of the diaphragm and maintain it in the position in which it happens to be when the manually operable means is actuated by the operator, and at the same time the arm 45 will move downwardly with respect to projection 49 which now presses against the side face of the arm, and the projection 50 extends across the upper edge of the arm 45 so as to maintain the manually operable means in the operating position thereof until it is again returned by he operator to the rest position which is illustrated in FIG. 3.

The above-described detent means of FIG. 3 is shown on an enlarged scale in FIG. 4 where there is illustrated the pin 51 fixed to the front wall 5 of the camera and on which the arms 43 and 45 of the lever 41 are turnable, these arms being connected to each other for turning movement together. Thus, the pin 51 forms the pivot 42. Moreover FIG. 4 shows the pins 52 which are also fixed to the front wall 5 and which fixedly carry the leaf springs 47 and 48.

It will be noted that with the structure of FIG. 3 the friction element 44 moves substantially along a line which bisects the angle formed by the tangents to the arcuate edges 29 and 30 at their intersection point 40. The element 44 maintains the diaphragm blades stationary as a result of the force of friction of the element 44 on the edges 29 and 30. This force of friction need only be relatively small inasmuch as the element 44 acts in a manner similar to a wedge and the turning of one edge will increase the force with which the element 44 is applied against the other edge. Thus, the element 44 will effectively block any turning of the plates.

If desired the arms of the lever 41 can be adjustably connected to each other or can be connected with each other through a suitable spring means. The blocking structure of the invention can have different details depending upon the particular structure of the diaphragm and the type of automatic control structure which cooperates therewith. Thus, it is possible to use the invention with diaphragms which include more than two diaphragm blades or on curtain-type diaphragms where the diaphragm elements move in parallel directions, or on any kind of diaphragm. Instead of a mechanical transmission of motion, the transmission of motion can take place in other manners. For example, pressing of a button such as the button 34 may close the circuit of an electromagnet whose armature will upon energizing of the electromagnet assume a position blocking the operation of the diaphragm.

As is shown in FIG. 5 the battery 12, the resistor 7, and the coils 20 and 21 are connected in a circuit in series in the manner shown in FIG. 5 so that the current in the circuit will vary according to the amount of light which is received by the resistor 7 so as to turn the coils through different angles corresponding to the size of the current.

In all embodiments of the invention, the manually operable blocking means is such that in its rest position it does not in any way interfere with the automatic operation of the diaphragm either in a mechanical sense or in such a way as to undesirably disturb the electrical circuits or to provide in any undesired manner a false position of the diaphragm in response to the automatic control structure.

It will be understood that each of the elements described above, or two or more together, may also find a useful application in other types of cameras differing from the types described above.

While the invention has been illustrated and described as embodied in automatic cameras, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a camera, in combination, diaphragm means including a plurality of movable diaphragm blades; automatic control means cooperating with said blades for controlling the position thereof according to the amount of light received by a light-sensitive element of said control means; and manually operable blocking means cooperating with at least one of said blades for preventing a change in the setting of the diaphragm means by said control means at the will of the operator, said manually operable blocking means pressing against said one blade with a force of friction sufficient to prevent turning of the diaphragm blades.

2. In a camera, in combination, diaphragm means including at least two diaphragm blades which include portions which overlap each other at a given location at all positions of said blades; automatic control means cooperating with said blades for respectively turning the latter about a pair of parallel axes according to the amount of light received by a light-sensitive element of said automatic control means, so that said blades are automatically set to predetermined angular positions providing the proper aperture; a stationary stop aligned with the portions of the blades at said location where the blades overlap in all positions, said stop being located on one side of said blades; and manually operable blocking means movable in a direction parallel to the turning axes of said blades and including a pressing portion aligned with said stop and located on the side of said blades opposite from said stop so that when the operator moves said pressing portion toward said stop the blades will be pressed between said stop and pressing portion of said blocking means to be held stationary irrespective of changes in the amount of light reaching said light-sensitive element of said control means.

3. In a camera, in combination, diaphragm means including at least two diaphragm blades which include portions which overlap each other at a given location at all positions of said blades; automatic control means cooperating with said blades for respectively turning the latter about a pair of parallel axes according to the amount of light received by a light-sensitive element of said automatic control means, so that said blades are automatically set to predetermined angular positions providing the proper aperture; a stationary stop aligned with the portions of the blades at said location where the blades overlap in all positions, said stop being located on one side of said blades; manually operable blocking means movable in a direction parallel to the turning axes of said blades and including a pressing portion aligned with said stop so that when the operator moves said pressing portion toward said stop the blades will be pressed between said stop and pressing portion of said blocking means to be held stationary irrespective of changes in the amount of light reaching said light-sensitive element of said control means; and spring means cooperating with said manually operable blocking means for resiliently urging the latter to a rest position where said pressing portion is spaced from said blades so that the latter can turn freely in response to actuation by said control means when said blocking means is in said rest position thereof.

4. In a camera, in combination, diaphragm means including a pair of diaphragm blades respectively turnable about a pair of parallel axes and respectively having arcuate free edges distant from said axes, said blades overlapping each other at all times and said arcuate edges crossing each other at a given location; automatic control means cooperating with said blades for automatically turning the latter respectively about said axes to angular positions determined by the amount of light reaching a light-sensitive element of said automatic control means so that said blades will automatically be set at positions providing the camera with a given aperture corresponding to the amount of light which reaches said light-sensitive element; a friction element located adjacent the location where said edges of said blades intersect; and manually operable means carrying said friction element for moving the latter at the option of the operator against both of said blades at said free edges thereof adjacent to the location where said edges intersect for preventing turning of said blades by said control means at the will of the operator.

5. In a camera, in combination, diaphragm means including a pair of diaphragm blades respectively turnable about a pair of parallel axes and respectively having arcuate free edges distant from said axes, said blades overlapping each other at all times and said arcuate edges crossing each other at a given location; automatic control means cooperating with said blades for automatically turning the latter respectively about said axes to angular positions determined by the amount of light reaching a light-sensitive element of said automatic control means so that said blades will automatically be set at positions providing the camera with a given aperture corresponding to the amount of light which reaches said light-sensitive element; a friction element located adjament the location where said edges of said blades intersect; and manually operable means carrying said friction element for moving the latter at the option of the operator against both of said blades at said free edges thereof adjacent to the location where said edges intersect for preventing turning of said blades by said control means at the will of the operator, said manually operable means which carry said friction element being in the form of a manually turnable lever turnable about a predetermined axis which is parallel to the turning axes of said blades, and the turning axis of said lever together with the point of intersection of said edges of said blades being located in a plane which is parallel to a second plane in which the turning axes of said blades are located.

6. In a camera, in combination, diaphragm means including a pair of diaphragm blades respectively turnable about a pair of parallel axes and respectively having arcuate free edges distant from said axes, said blades overlapping each other at all times and said arcuate edges crossing each other at a given location; automatic control means cooperating with said blades for automatically turning the latter respectively about said axes to angular positions determined by the amount of light reaching a light-sensitive element of said automatic control means so that said blades will automatically be set at positions providing the camera with a given aperture corresponding to the amount of light which reaches said light-sensitive element; a friction element located adjacent the location where said edges of said blades intersect; and manually operable means carrying said friction element for moving the latter at the option of the operator against both of said blades at said free edges thereof adjacent to the location where said edges intersect for preventing turning of said blades by said control means at the will of the operator, said friction element being made of a soft, elastic material.

7. In a camera, in combination, diaphragm means including a pair of diaphragm blades respectively turnable about a pair of parallel axes and respectively having arcuate free edges distant from said axes, said blades overlapping each other at all times and said arcuate edges crossing each other at a given location; automatic control means cooperating with said blades for automatically turning the latter respectively about said axes to angular positions determined by the amount of light reaching a light-sensitive element of said automatic control means so that said blades will automatically be set at positions providing the camera with a given aperture corresponding to the amount of light which reaches said light-sensitive element; a friction element located adjacent the location where said edges of said blades intersect; and manually operable means carrying said friction element for moving the latter at the option of the operator against both of said blades at said free edges thereof adjacent to the location where said edges intersect for preventing turning of said blades by said control means at the will of the operator; and detent means cooperating with said manually operable means for releasably maintaining the latter in a rest position where said friction element is spaced from the edges of said blades and in an operating position where said friction element engages said edges of said blades to block the turning of the latter.

8. In a camera, in combination, automatic diaphragm means operating to set the aperture of the camera according to the amount of light which reaches a light-sensitive element of said automatic diaphragm means; manually operable blocking means cooperating with said diaphragm means for blocking the automatic operation of the latter at the will of the operator; and spring means cooperating with said manually operable blocking means for returning the latter to a rest position freeing said diaphragm means for automatic operation except when said blocking means is engaged by the operator.

9. In a camera, in combination, automatic diaphragm means automatically operable to set the aperture of the camera according to the amount of light which reaches a light-sensitive element of the diaphragm means; manually operable blocking means cooperating with said diaphragm means for blocking the operation of the latter at the will of the operator, said blocking means having an operating position blocking said diaphragm means and a rest position freeing said diaphragm means for automatic operation; and detent means cooperating with said manually operable blocking means for releasably maintaining the latter in one or the other of said positions thereof.

10. In a camera, in combination, diaphragm means including a movable diaphragm blade; automatic control means cooperating with said blade for controlling the position thereof according to the amount of light received by a light-sensitive element of said control means; and manually operable blocking means cooperating with said blade for preventing a change in the setting of the diaphragm means by said control means at the will of the operator, said manually operable blocking means pressing against said blade with a force of friction sufficient to prevent turning of the diaphragm blade.

References Cited in the file of this patent
UNITED STATES PATENTS

| | | |
|---|---|---|
| 2,013,362 | Riszdorfer | Sept. 3, 1935 |
| 2,841,064 | Bagby et al. | July 1, 1958 |
| 2,923,170 | Pfaffenberger | Feb. 2, 1960 |